(12) United States Patent
Iwasaki (10) Patent No.: US 9,235,156 B2
(45) Date of Patent: Jan. 12, 2016

(54) LAYER THICKNESS REGULATING MEMBER FOR REGULATING LAYER THICKNESS OF DEVELOPER CARRIED ON DEVELOPER CARRYING MEMBER AND LAYER THICKNESS REGULATING MEMBER MANUFACTURING METHOD

(71) Applicant: CANON KABUSHIKI KAISHA, Tokyo (JP)

(72) Inventor: Hisanori Iwasaki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/451,766

(22) Filed: Aug. 5, 2014

(65) Prior Publication Data

US 2015/0043951 A1 Feb. 12, 2015

(30) Foreign Application Priority Data

Aug. 9, 2013 (JP) .................................. 2013-166635

(51) Int. Cl.
*G03G 15/08* (2006.01)
*B29C 45/40* (2006.01)

(52) U.S. Cl.
CPC ............ *G03G 15/0812* (2013.01); *B29C 45/40* (2013.01)

(58) Field of Classification Search
CPC ............................ G03G 15/0812; G03G 15/09
See application file for complete search history.

(56) References Cited

U.S. PATENT DOCUMENTS

2008/0298848 A1* 12/2008 Lee ................................ 399/274
2015/0043950 A1* 2/2015 Yasumoto et al. ............ 399/284

FOREIGN PATENT DOCUMENTS

| JP | 2001-255739 A | 9/2001 |
| JP | 2002-214886 A | 7/2002 |
| JP | 2012-247757 A | 12/2012 |

* cited by examiner

*Primary Examiner* — Gregory H Curran
(74) *Attorney, Agent, or Firm* — Fitzpatrick, Cella, Harper & Scinto (57) ABSTRACT

A layer thickness regulating member includes: an opposing portion having an opposing surface to a peripheral surface of a developer carrying member; and a layer thickness regulating portion, projected from the opposing surface toward the developer carrying member, for regulating a layer thickness of a developer carried on the developer carrying member. The layer thickness regulating portion is integrally molded with the opposing portion. The layer thickness regulating member is, after being molded in a metal mold, separated by being pushed from a side opposite from the opposing portion of the layer thickness regulating member when the layer thickness regulating member is separated from the metal mold.

2 Claims, 6 Drawing Sheets

LAYER THICKNESS REGULATING MEMBER FOR REGULATING LAYER THICKNESS OF DEVELOPER CARRIED ON DEVELOPER CARRYING MEMBER AND LAYER THICKNESS REGULATING MEMBER MANUFACTURING METHOD

FIELD OF THE INVENTION AND RELATED ART

The present invention relates to a layer thickness regulating member prepared by integrally molding, with a resin material, an opposing portion having an opposing surface to a peripheral surface of a developer carrying member and a layer thickness regulating portion for regulating a layer thickness of a developer, and relates to a layer thickness regulating member manufacturing method using injection molding.

An image forming apparatus in which an electrostatic image formed on an image bearing member is developed by a developing device to form a toner image and then the formed toner image is transferred onto a recording material and is heated and pressed by a fixing device to form an image on the recording material has been widely used. The developing device regulates, by a layer thickness regulating member, the developer carried on a rotating developer carrying member to carry the developer in a uniform thickness on the developer carrying member (Japanese Laid-Open Patent Application (JP-A) 2002-214886 and JP-A 2012-247757).

In a developing device in JP-A 2012-247757, a resin-made opposing member is extended in a beam shape between a pair of supporting member is rotatably supporting the developer carrying member at both ends of the developer carrying member. A resin-made layer thickness regulating member is fixed with screws to the opposing member in a state in which the layer thickness regulating member is positioned so that a predetermined gap is formed between a free end portion of the layer thickness regulating member and the developer carrying member.

In the developing device in JP-A 2012-247757, the layer thickness regulating member and the supporting members for supporting the layer thickness regulating member are provided as separate members, and therefore a component cost is expensive. In a state in which the layer thickness regulating member is positionally adjusted relative to the developer carrying member, the layer thickness regulating member is fixed on the opposing member with the screws at a plurality of positions, and therefore an assembling cost is expensive.

For this reason, it was proposed that the opposing member and the layer thickness regulating member provided with the layer thickness regulating portion are subjected as a whole to injection molding integrally with a resin material to prepare a single component. However, in actuality, when the layer thickness regulating member provided with the layer thickness regulating portion was prototyped by the injection molding, the layer thickness regulating member caused distortion, so that it was turned out that layer thickness non-uniformity was generated with respect to the developer carried on the developer carrying member.

SUMMARY OF THE INVENTION

A principal object of the present invention is to provide a layer thickness regulating member, molded with a metal mold, capable of alleviating stress acting on a layer thickness regulating portion with less distortion.

According to an aspect of the present invention, there is provided a layer thickness regulating member comprising: an opposing portion having an opposing surface to a peripheral surface of a developer carrying member; and a layer thickness regulating portion, projected from the opposing surface toward the developer carrying member, for regulating a layer thickness of a developer carried on the developer carrying member, wherein the layer thickness regulating portion is integrally molded with the opposing portion, wherein the layer thickness regulating member is, after being molded in a metal mold, separated by being pushed from a side opposite from the opposing portion of the layer thickness regulating member when the layer thickness regulating member is separated from the metal mold.

According to another aspect of the present invention, there is provided a manufacturing method of a layer thickness regulating member including: an opposing portion having an opposing surface to a peripheral surface of a developer carrying member; and a layer thickness regulating portion, projected from the opposing surface toward the developer carrying member, for regulating a layer thickness of a developer carried on the developer carrying member, the manufacturing method comprising: a first step of ejecting a resin material between a first split mold for molding the layer thickness regulating portion and the opposing portion at the opposing surface and a second split mold for molding the opposing portion in a side opposite from the opposing surface; a second step of solidifying the resin material ejected in the first step; and a third step of separating, after the second step, the layer thickness regulating member from the second split mold by pushing, against the layer thickness regulating member from the side opposite from the opposing surface, a ejecting member for separating the layer thickness regulating member from the second split mold.

These and other objects, features and advantages of the present invention will become more apparent upon a consideration of the following description of the preferred embodiments of the present invention taken in conjunction with the accompanying drawings.

DESCRIPTION OF THE EMBODIMENTS

Embodiments of the present invention will be specifically described with reference to the drawings.

(Image Forming Apparatus)

Figure 1:
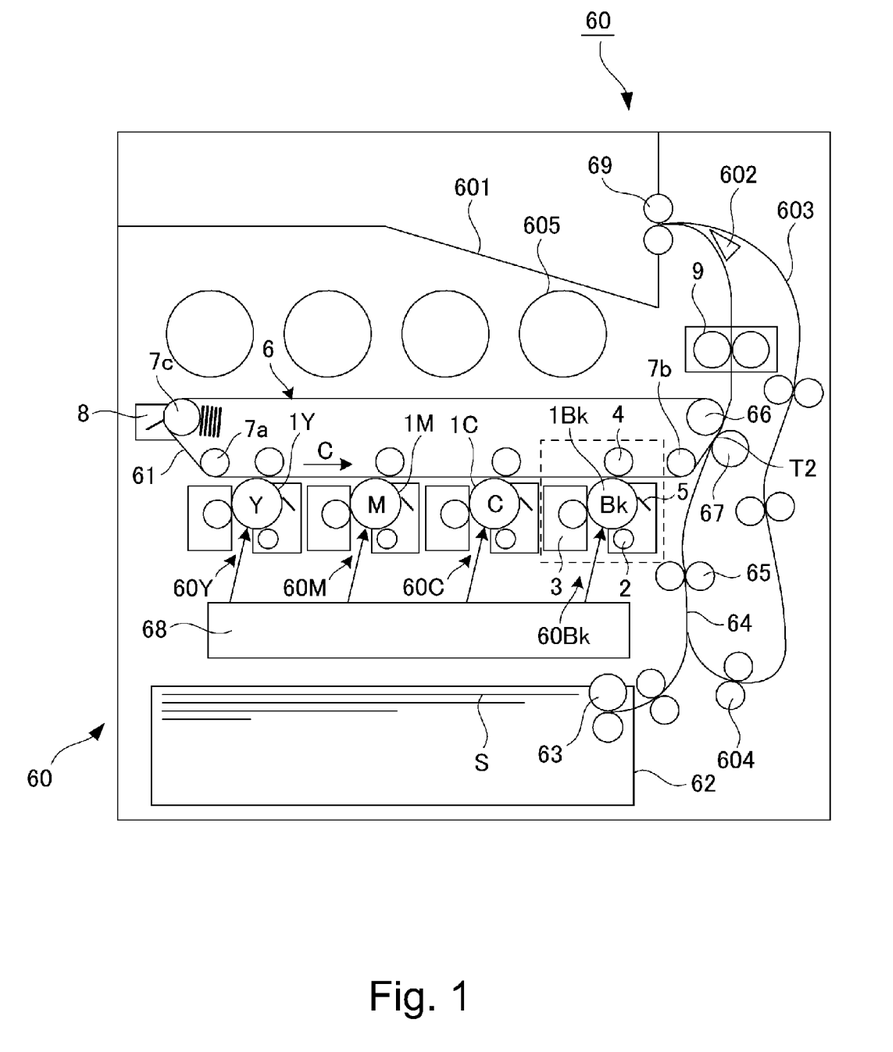
FIG. 1 is an illustration of a structure of an image forming apparatus.

FIG. 1 is an illustration of a structure of an image forming apparatus 60. As shown in FIG. 1, the image forming apparatus 60 is an intermediary transfer type full color printer of a tandem type in which image forming portions 60Y, 60M, 60C and 60Bk are arranged along a downward surface of an intermediary transfer belt 61.

At the image forming portion 60Y, a yellow toner image is formed on a photosensitive drum 1Y and then is transferred onto the intermediary transfer belt 61. At the image forming portion 60M, a magenta toner image is formed on a photosensitive drum 1M and then is transferred onto the intermediary transfer belt 61. At the image forming portions 60C and 60Bk, cyan and black toner images are formed on photosensitive drums 1C and 1Bk, respectively, and then are transferred onto the intermediary transfer belt 61.

The four color toner images transferred on the intermediary transfer belt 61 are conveyed to a secondary transfer portion T2 and are secondary-transferred onto the recording material S. A separation roller 63 separates sheets of the recording material S, one by one, pulled out from a recording material cassette 62, and then feeds the recording material S to a registration roller pair 65. The registration roller pair 65 sends the recording material S to the secondary transfer portion T2 while being timed to the toner images on the intermediary transfer belt 61. The recording material P on which the four color toner images are secondary-transferred is pressed and heated by a fixing device 9, so that the toner images are fixed on a surface of the recording material S.

(Image Forming Portion)

The image forming portions 60Y, 60M, 60C and 60Bk have the substantially same constitution except that colors of toners used in developing devices 3 are yellow, magenta, cyan and black, respectively, which are different from each other. In the following, the image forming portion 60Bk is described, and redundant explanation about other image forming portions 60Y, 60M and 60C will be omitted.

The image forming portion 60Bk includes, at a periphery of the photosensitive drum 1Bk, a charging device 2, an exposure device 68, the developing device 3, a transfer roller 4 and a drum cleaning device 5. The photosensitive drum 1Bk is prepared by forming a photosensitive layer on an outer peripheral surface of an aluminum cylinder, and is rotated at a predetermined process speed.

The charging device 2 electrically charges a surface of the photosensitive drum 1Bk to a negative potential uniformly by applying, to a charging roller, an oscillating voltage in the form of a negative (−polarity) DC voltage biased with an AC voltage. The exposure device 68 scans the surface of the photosensitive drum 1K with a laser beam, obtained by ON-OFF modulation of a scanning line image signal developed from an associated color image, through a rotating mirror, so that an electrostatic image for an image is written (formed) on the surface of the photosensitive drum 1Bk. The developing device 3 develops the electrostatic image into a toner image by transferring the toner onto the photosensitive drum 1Bk. A fresh toner in an amount corresponding to an amount of the toner consumed in the developing device 3 by image formation is supplied from a toner cartridge 605 to the developing device 3 via an unshown toner feeding path.

The transfer roller 4 presses the intermediary transfer belt 61 to form a transfer portion between the photosensitive drum 1Bk and the intermediary transfer belt 61. By applying a positive DC voltage to the transfer roller 4, the negative toner image carried on the photosensitive drum 1Bk is transferred onto the intermediary transfer belt 61. The drum cleaning device 5 removes a transfer residual toner deposited on the surface of the photosensitive drum 1Bk by sliding a cleaning blade on the surface of the photosensitive drum 1Bk.

The intermediary transfer belt 61 is extended around and supported by a tension roller 7c, a driving roller 66 also functioning as a secondary transfer opposite roller, and stretching rollers 7a and 7b, and is driven by the driving roller 66 to be rotated in an arrow C direction. A secondary transfer roller 67 contacts the intermediary transfer belt 61 supported at an inside surface thereof by the driving roller 66 to form the secondary transfer portion T2. By applying a positive DC voltage to the secondary transfer roller 67, the toner image on the intermediary transfer belt 61 is transferred onto the recording material S. A belt cleaning device 8 collects the transfer residual toner on the surface of the intermediary transfer belt 61 by rubbing the intermediary transfer belt 61 with a cleaning blade.

Embodiment 1

As shown in FIG. 1, a an image forming portion 60Bk as an example of a process cartridge develops, into the toner image by a developing device 3, the electrostatic image carried on the photosensitive drum 1 as an example of an image bearing member.

Figure 2:
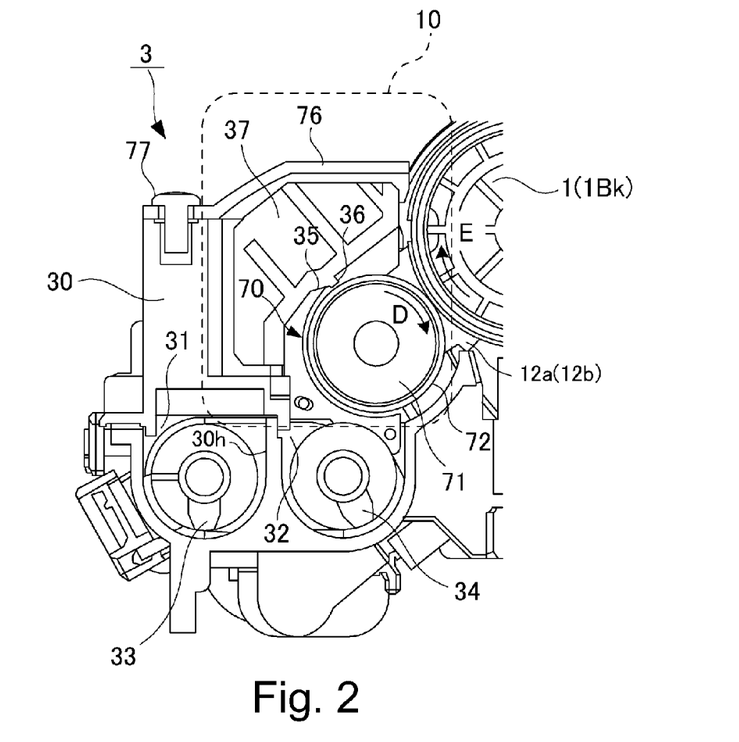
FIG. 2 is an illustration of a structure of a developing device in Embodiment 1.

As shown in FIG. 2, abutting portions 12a and 12b as an example of a positioning structure position a developing sleeve 70 relative to the developing device 1Bk at a position spaced from the photosensitive drum 1Bk with a predetermined gap (spacing). In the developing device 3, a sleeve holder frame 37 is provided in parallel to the developing sleeve 70. Sleeve bearing members 11a and 11b as an example of a pair of supporting portions are provided at both end portions of the sleeve holder frame 37 and rotatably support the developing sleeve 70 at both ends of the developing sleeve 70. The sleeve bearing members 11a and 11b are fixed on end surfaces of the sleeve holder frame 37 after adjusting a gap between a layer thickness regulating portion 36 and the developing sleeve 70 at a predetermined distance.

The sleeve holder frame 37 as an example of a layer thickness regulating member includes a developer rectifying portion 35 as an example of an upstream opposing portion, a base surface 37B as an example of a downstream opposing portion, and the layer thickness regulating portion 36 as an example of a layer thickness regulating portion. The developer rectifying portion 35 has an opposing surface to a peripheral surface of the developing sleeve 70 as an example of a developer carrying member. The layer thickness regulating portion 36 is projected from the developer rectifying portion 35 toward the developer carrying member and regulates a layer thickness of the developer carried on the developing sleeve 70.

(Process Cartridge)

As shown in FIG. 1, each of the image forming portions 60Y, 60M, 60C and 60Bk is prepared by integrally assembling portions excluding the exposure device 68 and the transfer roller 4 into a unit as a process cartridge which is an exchanging (replacing) unit for associated one of the colors. Each of the image forming portions 60Y, 60M, 60C and 60Bk is detachably mounted to an apparatus main assembly frame of the image forming apparatus 60. The transfer roller 4 is incorporated in an intermediary transfer unit 6 including the intermediary transfer belt 61. The process cartridge is prepared by integrally assembling the image forming portion 60Bk including the developing device 3 into a unit, and is detachably mountable to the image forming apparatus 60.

Incidentally, depending on some image forming apparatus, there is also the case where the drum cleaning device 5 is provided as an independent exchanging unit. There is also the case where the drum cleaning device 5 and the charging device are provided as an independent exchanging unit, and the photosensitive drum 1Bk and the developing device 3 are provided as a single process cartridge.

(Developing Device)

FIG. 2 is an illustration of a structure of the developing device 3 in Embodiment 1. As shown in FIG. 2, in the developing device 3, a two-component developer containing a (non-magnetic) toner and a (magnetic) carrier in mixture is stored in the developing container 30. The developing device 3 electrically charges the developer stored in the developing container 30, and then supplies the toner to the electrostatic image on the photosensitive drum 1Bk while carrying the charged developer on the surface of the developing sleeve 70.

The developing device 3 includes the developing sleeve 70 at an opening toward the photosensitive drum 1Bk. Below the developing sleeve 70, a first feeding screw 33 and a second feeding screw 34 are provided. The developing sleeve 70 and the first and second feeding screws 33 and 34 are rotationally driven integrally by being connected with gear trains provided at associated shaft ends outside the developing container 30.

The developing container 30 is partitioned into a first feeding chamber 31 and a second feeding chamber 32 by a partition wall 30h. The first and second feeding chambers 31 and 32 communicate with each other through an opening, of the partition wall 30h, formed at each of longitudinal end portions of the partition wall 30h. The first feeding screw 33 is disposed in the first feeding chamber 31, and the second feeding screw 34 is disposed in the second feeding chamber 32. By driving the first and second feeding screws 33 and 34, the developer is delivered through the openings of the partition wall 30h, so that the developer is circulated between the first and second feeding chambers 31 and 32. In a process in which the developer is fed while being stirred by the first and second feeding screws 33 and 34, the carrier and the toner in the developer are triboelectrically charged to the positive polarity and the negative polarity, respectively.

The developing sleeve 70 is supported rotatably around a magnet portion 71 supported non-rotatably by the developing container 30, and opposes the second feeding screw 34 with respect to a circumferential direction. The second feeding screw 34 supplies the developer to the developing sleeve 70 while feeding the developer in the second feeding chamber 32. The supplied developer is carried on the surface of the developing sleeve 70 by a magnetic force of the magnet portion 71 and is fed in an arrow D direction.

The magnet portion 71 generates a magnetic field for magnetically carrying the developer on the surface of the rotating developing sleeve 70. Magnetic poles of the magnet portion 71 is fixed at predetermined phase positions with respect to the circumferential direction and are supported non-rotatably, and therefore magnetic pole patterns formed on the surface of the developing sleeve 70 are fixed at predetermined phases with respect to the circumferential direction. Around the magnet portion 71, only a sleeve pipe 72 constituting an outer shell of the developing sleeve 70 is supported rotatably. The carrier and the toner in the developer are carried in an erected chain shape on the surface of the developing sleeve 70 in a deposited state by triboelectric charge at associated magnetic polarity positions of the magnet portion 71.

The developing sleeve 70 opposes the second feeding screw 34, the developer rectifying portion 35, the layer thickness regulating portion 36 and the photosensitive drum 1 in the listed order along the rotational direction thereof. The developer rectifying portion 35 constitutes a guide when the developer is fed. The developer carried on the developing sleeve 70 rotating in the arrow D direction passes through the developer rectifying portion 35, and then the layer thickness of the developer is regulated by the layer thickness regulating portion 36. Stagnation of the developer is formed in a space defined by the developer rectifying portion 35 and the developing sleeve 70 in front of the layer thickness layer thickness regulating portion 36, so that a density of the developer with respect to the rotational axis direction of the developing sleeve 70 is uniformized.

The layer thickness regulating member (sleeve holder frame) 37 causes a free end of the layer thickness regulating portion 36 to oppose the surface of the developing sleeve 70. The chain-shaped developer erected by the magnetic field of the developing sleeve 70 is fed toward the layer thickness regulating portion 36. A gap between the free end surface of the layer thickness regulating portion 36 and the surface of the developing sleeve 70 is set in a desired range, and therefore the erected chain-shaped developer forms a uniform thickness coating layer by passing through the layer thickness regulating portion 36.

An opposing distance between the developing sleeve 70 and the photosensitive drum 1 which are disposed opposed to each other is set at a predetermined value (300 μm) by abutment portions 12a and 12b formed on the sleeve bearing members 11a and 11b (FIG. 3) for supporting the rotation shaft of the developing sleeve 70. The opposing distance between the developing sleeve 70 and the photosensitive drum 1 is referred to as SD gap. The electrostatic image on the photosensitive drum 1 is developed by the magnetic chain rubbing the surface of the photosensitive drum 1 in a height exceeding the SD gap. The rotational direction D of the developing sleeve 70 is set as a counter direction to the rotational direction E of the photosensitive drum 1, but may also be the same direction as the rotational direction at the opposing portion.

(Developing Sleeve Unit)

Figure 3:
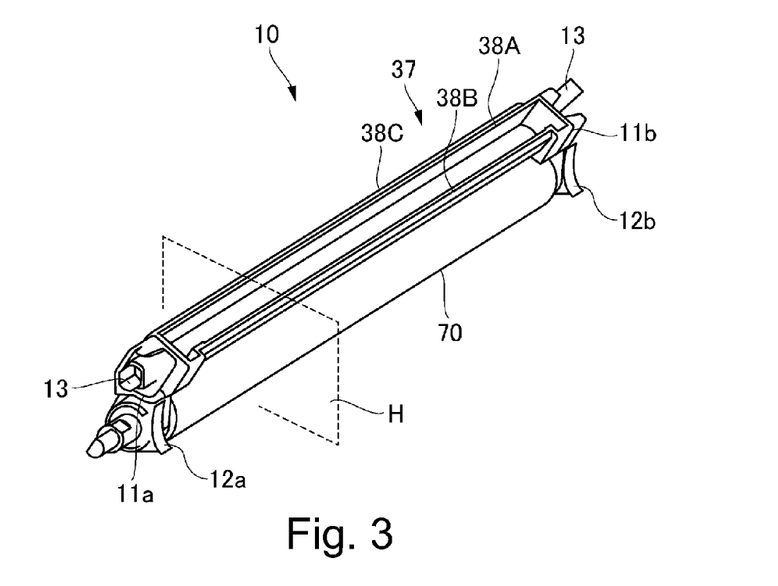
FIG. 3 is a perspective view of a developing sleeve unit in Embodiment 1.

FIG. 3 is a perspective view of a developing sleeve unit 10 in this embodiment. As shown in FIG. 3, the developing sleeve unit 10 is an exchanging unit prepared by integrally assembling the developing sleeve 70, the sleeve bearing members 11a and 11b and the sleeve holder frame 37 into a unit. An attitude of the developing sleeve unit 10 is held relative to the developing container 30 by a pair of positioning shafts 13 with which the sleeve bearing members 11a and 11b are provided. The positioning shafts 13 swingably support the developing sleeve 70 relative to the developing container 30, and do not prevent thermal expansion and contraction of the sleeve holder frame 37.

The developing sleeve 70 is supported at end portions thereof rotatably by the sleeve bearing members 11a and 11b. Cylindrical shafts projecting from ends of the developing sleeve 70 are inserted into bearings (sintered bearings) engaged in the sleeve bearing members 11a and 11b.

The sleeve holder frame 37 is extended in a beam shape between the pair of sleeve bearing members 11a and 11b. The sleeve bearing members 11a and 11b are fixed at the end surfaces of the sleeve holder frame 37 after adjusting an SB gap where the layer thickness regulating portion 36 (FIG. 2) and the developing sleeve 70 oppose each other.

The adjustment of the SB gap is made by moving a position of the sleeve holder frame 37 as a whole relative to the sleeve bearing members 11a and 11b. For example, while keeping a state in which an SB gap value falling within a desired range is confirmed by a TV camera or the like, the sleeve holder frame 37 is fixed to the sleeve bearing members 11a and 11b, thus being assembled into a unit as a whole. As a fixing method thereof, screws or the like may be used. However, in the case where the sleeve holder frame 37 and the sleeve bearing members 11a and 11b are formed of the resin material, it is desirable that the fixing method such as laser welding or UV bending is selected. Compared with the screws or the like, the laser welding or the UV bonding is capable of suppressing a degree of torsion between the members with the fixing to a small amount.

(Layer Thickness Regulating Member)

Figure 4:
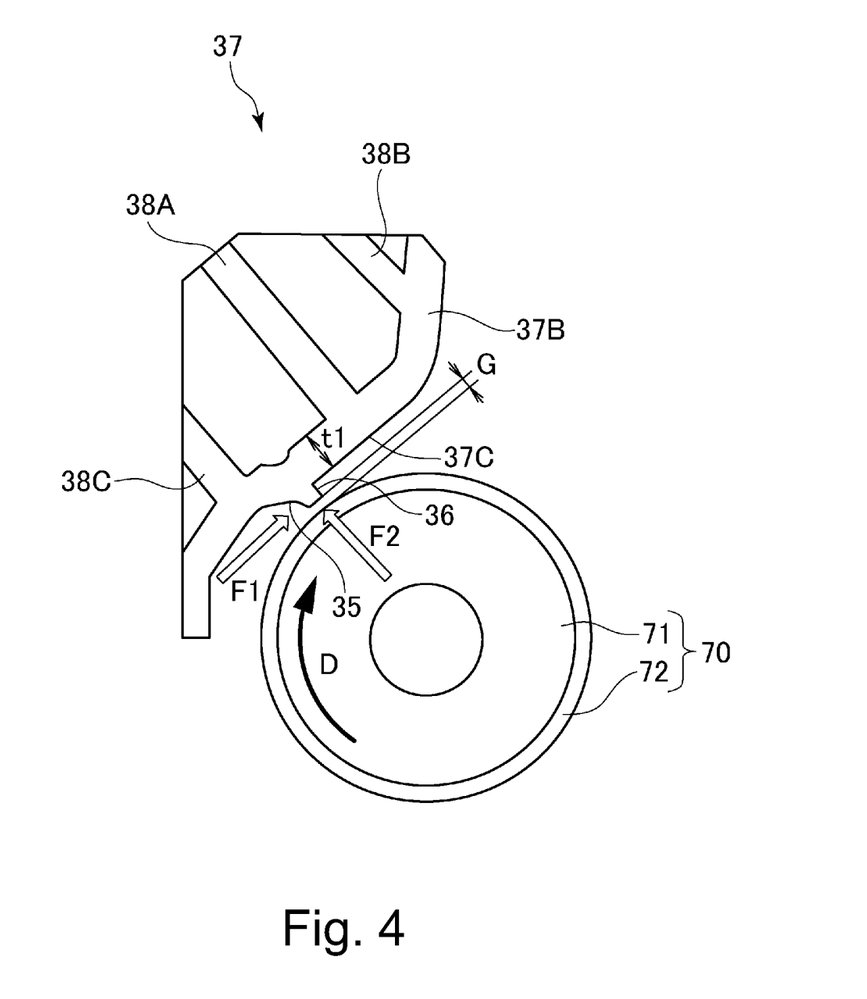
FIG. 4 is a sectional view of a sleeve holder frame in cross section perpendicular to a shaft of a developing sleeve.

FIG. 4 is a sectional view of the sleeve holder frame 37 in cross-section perpendicular to the shaft of the developing sleeve 70. As shown in FIG. 4, the developer rectifying portion 35 as an example of an upstream opposing surface opposes the developing sleeve 70 in a region in which the developing sleeve 70 enters the layer thickness regulating portion 36. The base surface 37B as an example of a downstream opposing surface opposes the developing sleeve 70 in a region where the developing sleeve 70 passes through the layer thickness regulating portion 36. Reinforcing ribs 38C and 38B are provided in the developer rectifying portion 35 side and the base surface 37B side, respectively, with respect to an overlapping position with the layer thickness regulating portion 36 with respect to a projecting direction of the layer thickness regulating portion 36.

The sleeve holder frame 37 is provided with reinforcing ribs 38A, 38B and 38C in a side opposite from a side where the sleeve holder frame 37 opposes the developing sleeve 70. The sleeve holder frame 37 is a single component integrally formed of a thermoplastic resin material by injection molding, and constitutes a part of a double housing structure for holding the developing sleeve 70.

The sleeve holder frame 37 is provided with the layer thickness regulating portion 36, the developer rectifying portion 35 and a cover portion 37C in the side where the base surface 37B formed in a base thickness t1 opposes the developing sleeve 70. The base surface 37B, the layer thickness regulating portion 36, the reinforcing ribs 38A, 38B and 38C are integrally constituted in the cross-section, of the sleeve holder frame, perpendicular to the developing sleeve axis. As the resin material used for the sleeve holder frame 37, a material, having relatively high rigidity, such as PC+AS resin material or PC+ABS resin material is selected.

(Metal Mold Constitution)

Figure 5:
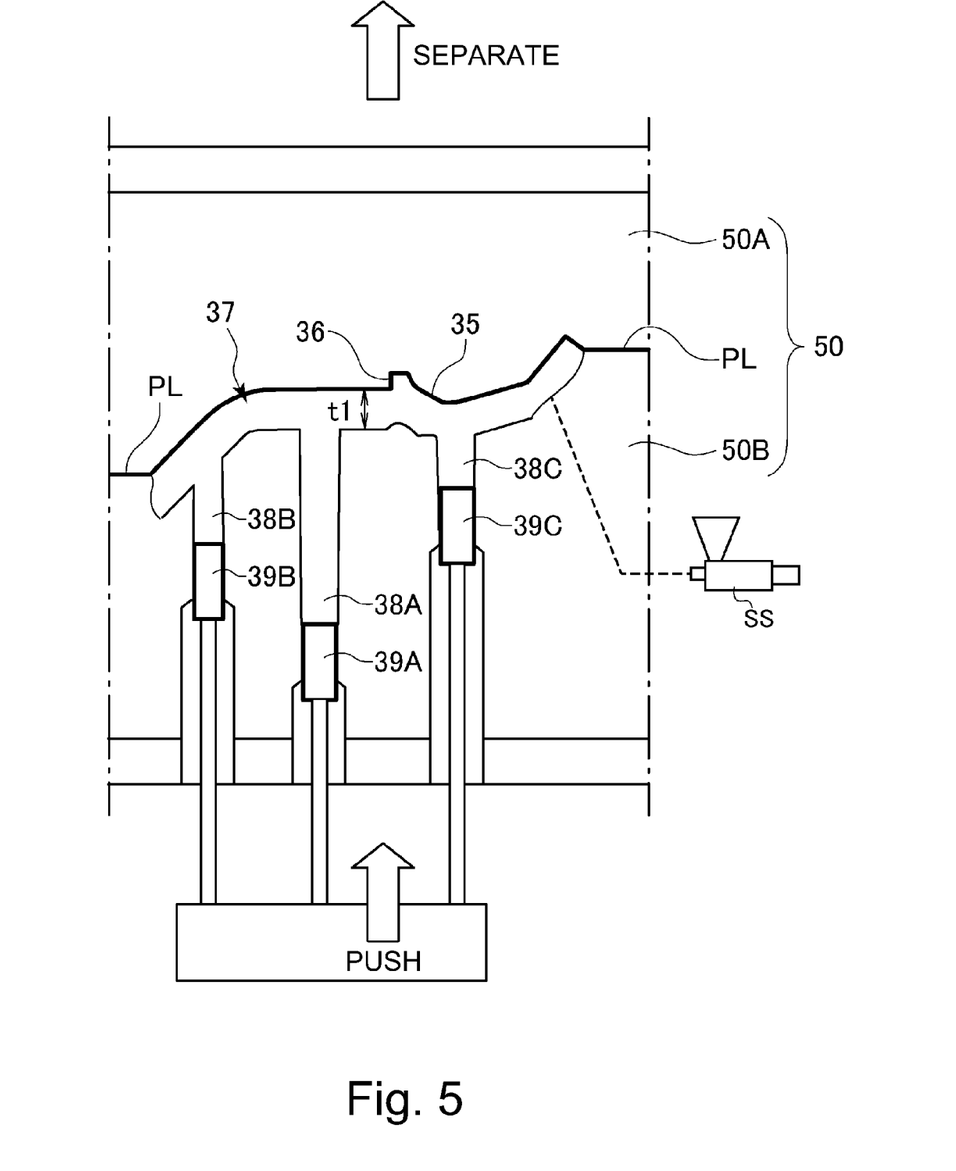
FIG. 5 is an illustration of a metal mold for injection molding in Embodiment 1.

FIG. 5 is an illustration of a metal mold for injection molding. As shown in FIG. 5, the sleeve holder frame 37 is integrally formed by injection molding by using an injection molding metal mold 50 as an example of a metal mold. A recess-side split mold 50A as an example of a first split mold is used for molding the developer rectifying portion 35 and the layer thickness regulating portion 36. A core-side split mold 50B as an example of a second split mold is used for molding the sleeve holder frame 37 in the side opposite from the developer rectifying portion 35.

An ejecting pin 39A as an example of an ejecting member (pressing member) is provided movably so as to penetrate through the core-side split mold 50B in order to separate a resin-molded product.

The sleeve holder frame 37 includes, in the side opposite from the layer thickness regulating portion 36, the reinforcing ribs 38A and 38B as an example of a rib portion which projects in a movement direction of an associated one of ejecting pins 39A and 39B and which continuously extends in a developer rotational axis direction. A contact position of the ejecting pin 39A is a free end surface of the reinforcing rib 38A.

The sleeve holder frame 37 is prepared by solidifying a resin-molded product obtained by injecting the resin material between the recess-side split mold 50A and the core-side split mold 50B and then by pushing out the solidified resin-molded product from the cross-side split mold 50B by the ejecting pin 39A.

The sleeve holder frame 37 is the layer thickness regulating member characterized in that the recess-side split mold 50A is separated (parted) from the core-side split mold 50B by moving the recess-side split mold 50A is the projecting direction of the layer thickness regulating portion 36 before the solidified resin-molded product is separated from the core-side split mold 50B.

The sleeve holder frame 37 is subjected to an injection molding process by using the injection molding metal mold 50. The recess-side split mold 50A and the core-side split mold 50B of the injection molding metal mold 50 are separated along a separating line PL. The recess-side split mold 50A includes a side where the developer rectifying portion 35 and the cover portion 37C are molded and a recessed portion where the layer thickness regulating portion 36 is molded. The core-side split mold 50B includes a recessed portion where the base surface 37B is molded and a recessed portion where the reinforcing ribs 38A, 38B and 38C are molded.

After the injection molding, when the recess-side split mold 50A is separated from the core-side split mold 50B, the molded sleeve holder frame 37 is held on the core-side split mold 50B. For this reason, the ejecting pins 39A, 39B and 39C project to free end positions of the reinforcing ribs 38A, 38B and 38C of the sleeve holder frame 37, thus pushing out the sleeve holder frame 37 from the core-side split mold 50B.

Comparison Example 1

Figure 6:
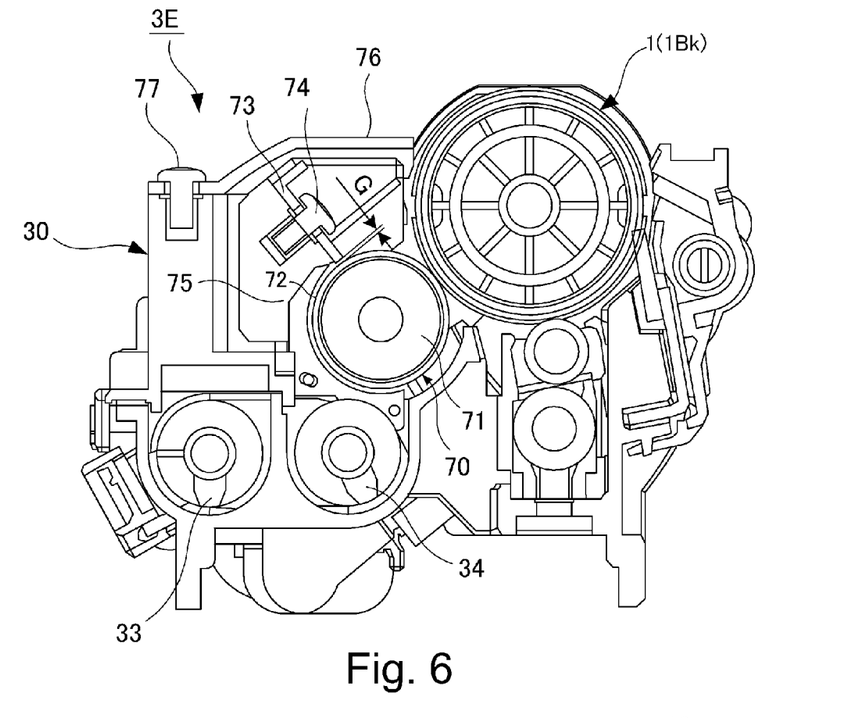
FIG. 6 is an illustration of a structure for a developing device in Comparison Example 1.

FIG. 6 is an illustration of a structure of a developing device in Comparison Example 1. As shown in FIG. 6, in a developing device 3E in Comparison Example 1, a layer thickness regulating member (doctor blade) 73 and a base member 75 are separate members, and as the layer thickness regulating member 73, a thin metal plate member formed of stainless steel is used. A free end portion of the metal-made layer thickness regulating member 73 is caused to oppose a peripheral surface of the developing sleeve 70 to form an SB gap G. An erected chain-like developer deposited on the developing sleeve 70 by a magnetic field is uniformly cut, so that a developer coating layer having a uniform thickness is formed on the developing sleeve 70. Therefore, the SB gap G is required to be uniform with respect to a direction perpendicular to a developer feeding direction.

Also in Comparison Example 1, a cover 76 of the developing device 3E is dismounted, and then the developing sleeve 70 and the base member 75 are integrally dismountable and mountable. In a state in which the developing sleeve 70, the sleeve bearing members 11a and 11b (FIG. 3), and the base member 75 are integrally dismounted, jigs are set and then the layer thickness regulating member 73 is moved relative to the base member 75 so that the SB gap G falls within a desired range. In a state in which the layer thickness regulating member 73 is positionally adjusted manually on the base member 75, the layer thickness regulating member 73 is fixed on the base member 75 by adjusting screws 74.

In Comparison Example 1, there is a need to effect trial-and-error adjustment while taking into account also an amount of deformation at each position in the case where the layer thickness regulating member 73 is fastened by the adjusting screws 74 at a plurality of positions, and therefore an operation efficiency of assembling adjustment is poor.

In Comparison Example 1, the layer thickness regulating member 73 is a thin metal member, and therefore there is a possibility that bending and vibration occur. When the layer thickness regulating member 73 receives a large load from the developer on the surface of the developing sleeve 70, there is a possibility that the layer thickness regulating member 73 deforms in an interval between the adjusting screws 74. When the layer thickness regulating member 73 deforms, the SB gap G displaces in a rotational axis direction of the developing sleeve 70 and a developer coating amount becomes non-uniform, thus causing image density non-uniformity. When the metal-made layer thickness regulating member is abraded, there is a possibility that metal powder with the abrasion is included in the developer on the developing sleeve 70.

(Effect of Embodiment 1)

With respect to the sleeve holder frame 37 in Embodiment 1, from the viewpoints of reductions in weight and cost, the metal material is replaced with the resin material. The resin material is non-magnetic and is high in flexibility of the mold process, thus being preferable.

With respect to the sleeve holder frame in Embodiment 1, the developer rectifying portion 35 corresponding to the base member in Comparison Example 1 and the layer thickness regulating portion 36 corresponding to the layer thickness regulating member 73 in Comparison Example 1 are integrally constituted, so that a problem of inefficient adjustment in Comparison Example 1 is solved. The integral constitution between the developer rectifying portion 35 and the layer thickness regulating portion 36 easily ensures large geometrical moment of inertia also in terms of rigidity.

With respect to the sleeve holder frame 37 in Embodiment 1, the developer rectifying portion and the layer thickness regulating portion can be precisely constituted by inexpensive material and processing method. As a result, the layer thickness regulating member having high accuracy and high rigidity can be realized while being inexpensive, and it is possible to stably realize a uniform coating amount with respect to the longitudinal direction of the developing sleeve 70. As a result, a stable developer density can be obtained, and it becomes possible to stably maintain the image density with respect to the load received from the developer and a change in operation environment (temperature and humidity).

With respect to the sleeve holder frame 37, the resin material is used as the material, and therefore it is possible to contribute to reductions in the number of components and weight of the developing device 3. The metal material is not used at the portion contacting the developer, and therefore it is possible to reduce a factor of inclusion of the metal powder in the developer subjected to layer thickness regulation.

According to the injection molding metal mold 50 in Embodiment 1, the recess-side split mold 50A has a shape such that a parting (separating) property is good, and therefore a degree of the deformation of the sleeve holder frame 37 when the recess-side split mold 50A is separated from the cone-side split mold 50B can be suppressed to a minimum.

According to the injection molding metal mold 50 in Embodiment 1, the ejecting pins 39A, 39B and 39C push the reinforcing ribs 38A, 38B and 38C, respectively, at free end positions, and therefore the degree of the deformation of the sleeve holder frame 37 when the core-side split mold 50B is separated can be suppressed to a minimum.

For this reason, a degree of warpage of the layer thickness regulating portion 36 with respect to the longitudinal direction in a process in which the sleeve holder frame 37 is removed from the mold after the injection molding is reduced, so that straightness of the layer thickness regulating portion 36 is easily ensured.

As shown in FIG. 3, even when the flexure due to the forces F1 and F2 generated by the developer during image formation and the warpage due to the thermal deformation are included, the straightness of the layer thickness regulating portion 36 was able to be suppressed to 20-30 μm or less. Even when a temperature is increased by continuously effecting the image formation for 6 hours from start of the continuous image formation, it was confirmed that the stable image density was obtained throughout the image formation.

According to the injection molding metal mold 50 in Embodiment 1, the layer thickness regulating portion 36 and the developer rectifying portion 35 can be manufactured by using the inexpensive resin material and the injection molding process having high productivity, and therefore a manufacturing cost of components is reduced. Different from JP-A 2012-247757, a cumbersome adjusting operation such that the developer layer thickness regulating blade is positionally adjusted and then mounted on the beam member is omitted. The metal-made blade member is not used as the layer thickness regulating portion 36, and therefore, different from the metal-made blade member, the metal powder is not generated in friction with the developer.

Generally, in order to prevent generation of the image density non-uniformity, the straightness and warpage of the layer thickness regulating portion 36 are required to beat a level of 20-30 μm or less. The injection molding metal mold 50 has no problem of the parting property from the metal mold and the deformation by the pushing when the developer rectifying portion 35 and the layer thickness regulating portion 36 are integrally formed of the resin material by the injection molding process, and therefore the straightness and warpage of the layer thickness regulating portion are at the level of 20-30 μm or less.

With respect to the sleeve holder frame 37 in Embodiment 1, based on the metal mold constitution of the sleeve holder frame 37, the layer thickness regulating member having high accuracy and high rigidity while being in expensive can be realized, and there is provided an electrophotographic developing device capable of providing a stable developer density.

The sleeve holder frame 37 in Embodiment 1 is not readily deformed due to expansion and contraction of the material with the load applied from the developer to the layer thickness regulating portion 36 and with the change in the operation environment (temperature and humidity) or due to the parting property and the pushing (ejection) during the molding process. With respect to the sleeve holder frame 37, a degree of the influence of a lowering in straightness and warpage with the load on the layer thickness regulating portion 36, the expansion and contraction of the material, and the molding process is reduced, and therefore a density fluctuation of an output image was not readily generated.

(Discriminating Manner of Embodiment 1)

With respect to the sleeve holder frame 37, at top surfaces of the reinforcing ribs 38A, 38B and 38C, pin traces (marks) of the ejecting pins 39A, 39B and 39C are formed at predetermined intervals.

As shown in FIG. 5, each of the ejecting pins 39A, 39B and 39C are held in a piston-like shape in a cylinder formed in the core-side split mold 50B, and therefore low burrs formed along edges of the cylinders.

Embodiment 2

Figure 7:
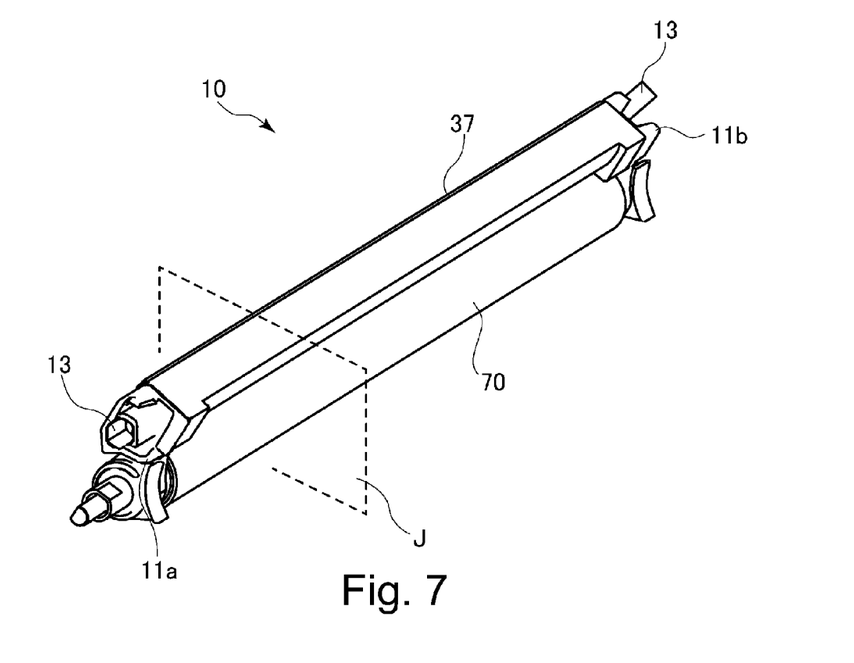
FIG. 7 is a perspective view of a developing sleeve unit in Embodiment 2.
Figure 8:
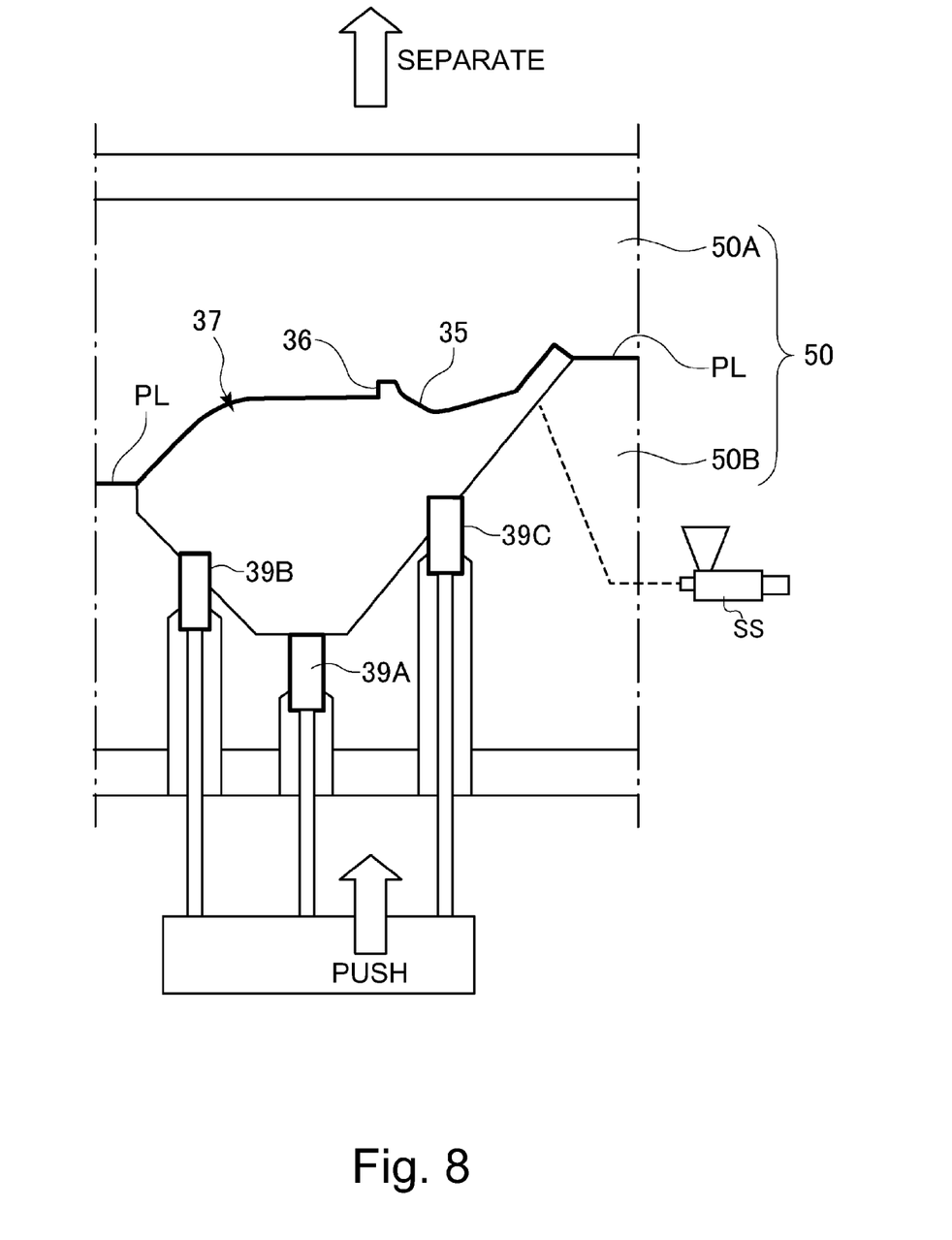
FIG. 8 is an illustration of a metal mold for injection molding in Embodiment 2.

FIG. 7 is a perspective view of a support unit in Embodiment 2. FIG. 8 is an illustration of a metal mold for injection molding in this embodiment. As shown in FIG. 8, a sleeve holder frame 37 is integrally molded by using a foam resin material.

As shown in FIG. 7, Embodiment 2 is similarly constituted as in Embodiment 1 except that the sleeve holder frame 37 is not provided with a reinforcing rib and that the sleeve holder frame 37 is formed of the foam resin material. Accordingly, in FIGS. 7 and 8, constituent elements which are the same as those in Embodiment 1 are represented by the same reference numerals or symbols as those in FIGS. 5 and 6 and will be omitted from description.

As shown in FIG. 8, the sleeve holder frame 37 has a shape such that there is no thick portion such as a reinforcing rib in the case where the sleeve holder frame 37 is cut along an arbitrary cross-section with respect to a longitudinal direction thereof. In place thereof, with respect to the sleeve holder frame 37, the shape is realized by a foam molding process using the resin material, so that saving of the material and a reduction in weight are realized.

The recess-side split mold 50A and the core-side split mold 50B of the injection molding metal mold 50 are separated along a separating line PL. The recess-side split mold 50A includes a side where the developer rectifying portion 35 and a base surface 37B are molded and a recessed portion where the layer thickness regulating portion 36 is molded. The core-side split mold 50B includes a recessed portion where a thick portion of the base surface 37B is molded and a recessed portion where the reinforcing ribs 38A, 38B and 38C are molded.

After the injection molding, when the recess-side split mold 50A is separated from the core-side split mold 50B, the molded sleeve holder frame 37 is held on the core-side split mold 50B. For this reason, the ejecting pins 39A, 39B and 39C project to free end positions of the reinforcing ribs 38A, 38B and 38C of the sleeve holder frame 37, thus pushing out the sleeve holder frame 37 from the core-side split mold 50B.

(Effect of Embodiment 2)

With respect to the sleeve holder frame 37, even when flexure due to a load and warpage due to thermal deformation are included, it becomes possible to straightness of the layer thickness regulating portion 36 can be suppressed to 20-30 µm or less, so that it was possible to provide a developing device capable of providing a stable image density.

The sleeve holder frame in this embodiment has a shape such that the same cross-sectional configuration is continued over an entire region with respect to a rotational axis direction of the developing sleeve 70, and therefore a distribution of thermal stress with a change in operation environment (temperature and humidity) becomes uniform.

The sleeve holder frame 37 in this embodiment is not provided with the thick reinforcing rib, and geometrical moment of inertia can be sufficiently ensured, and therefore it is possible to ensure rigidity against forces F1 and F2.

Incidentally, in actuality, the sleeve holder frame 37 has the same cross-sectional shape over the entire region of a developer carrying area, but exceptionally has a shape such as a screw fastening hole and a positioning boss which are provided at each of both end portions as bonding surfaces to the sleeve bearing members 11a and 11b.

Embodiment 3

The present invention can be carried out also in other embodiments in which a part or all of constituent elements in the above-described embodiments are replaced with alternative constituent elements thereof so long as the layer thickness regulating member formed integrally with the layer thickness regulating portion is pushed out (ejected) from the split mold provided in a side opposite from the layer thickness regulating portion. When the developing device and the process cartridge include the toner regulating member formed integrally with the layer thickness regulating portion, the present invention is capable of being carried out.

In Embodiments 1 to 3, the case of the developing device is described as an example, but a similar effect can be obtained even when a process cartridge prepared by integrally assembling the image forming portion 60Bk (FIG. 4) including the developing device into a unit and being made detachably mountable to the image forming apparatus is used. Further, when the image forming apparatus includes such a developing device or a process cartridge, the present invention is applicable irrespective of a monochromatic machine (image forming apparatus) and a color machine (image forming apparatus).

The image forming apparatus can be carried out irrespective of a difference between one-drum type and tandem type and a difference between intermediary transfer type and a recording material feeding member type. The image forming apparatus can also be carried out irrespective of the number of image bearing members, a charging type of the image bearing members, an electrostatic image forming type, a transfer type, and the like.

Further, in the above-described embodiments, only a principal portion relating to toner image formation and transfer is described, but the present invention can be carried out in image forming apparatuses, having various uses, such as printers, various printing machines, copying machines, facsimile machines, and multi-function machines, by adding necessary equipment, devices and casing structures.

The effects of Embodiments 1 to 3 are not limited to those with respect to the resin material, but may be similarly obtained even in the case where the layer thickness regulating member is formed by a molding process (e.g., die-casting) using a metal material.

In Embodiments 1 to 3, the case of the developing device is described as an example, but effects similar to those in Embodiments 1 to 3 can be obtained also in the case where the present invention is carried out in the process cartridge which is integrally assembled with the photosensitive drum or the like into an exchanging unit and which is detachably mountable to the image forming apparatus.

The layer thickness regulating member of the present invention is pushed out by the ejecting member from the side, of the opposing portion, opposite from the layer thickness regulating portion and thus is separated from the second split mold, and therefore the stress generated in the layer thickness regulating member when the layer thickness regulating member is pushed out less influences the layer thickness regulating portion.

Accordingly, the stress acting on the layer thickness regulating portion when the layer thickness regulating member is separated from the second split mold is alleviated by improving the metal mold for the layer thickness regulating member, s that it is possible to provide a layer thickness regulating member with less distortion at the layer thickness regulating portion.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 166635/2013 filed Aug. 9, 2013, which is hereby incorporated by reference.

What is claimed is:

1. A layer thickness regulating member comprising:
a base portion;
a layer thickness regulating portion, projected from a front side surface of the base portion, configured to regulate a layer thickness of a developer; and a reinforcing rib portion, projected in a rear side of the base portion, formed along a longitudinal direction of the layer thickness regulating member, wherein the layer thickness regulating portion and the reinforcing rib portion are integrally molded with the base portion, wherein the layer thickness regulating portion is separated from a metal mold by pushing out a free end of the reinforcing rib portion from a rear side of the base portion by a plurality of pushing-out members after being metal-molded, and wherein a molding trace by the plurality of pushing-out members is formed on a surface of the free end of the reinforcing rib portion.

2. The layer thickness regulating member according to claim 1, wherein the reinforcing rib portion is provided at a non-overlapping position with a position corresponding to a position where the layer thickness regulating portion is provided.

* * * * *